United States Patent [19]

Blair, Jr.

[11] 4,326,984

[45] Apr. 27, 1982

[54] MICELLAR SOLUTIONS OF THIN FILM SPREADING AGENTS COMPRISING POLYEPOXIDE CONDENSATES OR RESINOUS POLYALKYLENE OXIDE ADDUCTS AND POLYETHER POLYOLS

[75] Inventor: Charles M. Blair, Jr., Buena Park, Calif.

[73] Assignee: Magna Corporation, Santa Fe Springs, Calif.

[21] Appl. No.: 82,364

[22] Filed: Oct. 5, 1979

[51] Int. Cl.$^3$ ...................... B01D 17/04; E21B 43/22
[52] U.S. Cl. .................................... 252/358; 210/708; 210/729; 252/8.55 E; 252/331; 252/333; 252/340; 252/344
[58] Field of Search ...................... 252/8.55 D, 8.55 C, 252/331, 333, 339, 358, 340, 341, 344, 8.55 E; 166/303

[56] References Cited

U.S. PATENT DOCUMENTS

| 2,356,205 | 8/1944 | Blair et al. | 252/8.55 |
| 2,626,929 | 1/1953 | DeGroote | 252/342 |
| 2,792,352 | 5/1957 | DeGroote et al. | 252/331 |
| 2,792,355 | 5/1957 | DeGroote et al. | 252/331 |
| 2,819,212 | 1/1958 | DeGroote et al. | 252/331 |

Primary Examiner—Herbert B. Guynn
Attorney, Agent, or Firm—William C. Norvell, Jr.

[57] ABSTRACT

The invention provides a homogeneous, micellar solution of a water-insoluble thin film spreading agent comprising polyepoxide condensates of resinous polyalkylene oxide adducts and polyether polyols comprising: (a) from between about 5% and about 75% by weight of said polyepoxide condensate; (b) from between about 2% and about 30% by weight of a hydrotropic agent; (c) from between about 2% and about 30% by weight of an amphipathic agent; and (d) from between about 15% and about 90% by weight of water.

46 Claims, No Drawings

MICELLAR SOLUTIONS OF THIN FILM SPREADING AGENTS COMPRISING POLYEPOXIDE CONDENSATES OR RESINOUS POLYALKYLENE OXIDE ADDUCTS AND POLYETHER POLYOLS

BACKGROUND OF THE INVENTION

1. Field of the Invention

The invention relates to a new and improved micellar solution of a thin film spreading agent comprising polyepoxide condensates of resinous polyalkylene oxide adducts and polyether polyols which are particularly useful for breaking or preventing petroleum emulsions. More specifically, the invention relates to a composition in which water replaces all or a substantial part of the organic solvents formerly required for preparation of liquid solutions of this interfacially active compound.

2. Description of the Prior Art

One of the principal uses of the present composition is in the breaking of petroleum emulsions to permit the separation thereof into two bulk phases. Much of the crude petroleum oil produced throughout the world is accompanied by some water or brine which originates in or adjacent to the geological formation from which the oil is produced. The amount of aqueous phase accompanying the oil may vary from a trace to a very large percentage of the total fluid produced. Due to the natural occurrence in most petroleum of oil-soluble or dispersible emulsifying agents, much of the aqueous phase produced with oil is emulsified therein, forming stable water-in-oil emulsions.

The literature contains numerous reference to such emulsions, the problems resulting from their occurrence, and the methods employed to break them and separate salable petroleum. See, for example, "The Technology of Resolving Petroleum Emulsions" by L. T. Monson and R. W. Stenzel, p. 535 et seq in *Colloid Chemistry* Vol VI, Ed. by Jerome Alexander, Rheinhold Publishing Corp., New York (1946) and "Interfacial Films Affecting the Stability of Petroleum Emulsions" by Chas. M. Blair, Jr. in *Chemistry and Industry* (London), p. 538 et seq (1960).

Early demulsifiers used to resolve petroleum emulsions were water-soluble soaps, Twitchell reagents, and sulfonated glycerides. These products were readily compounded with water to form easily pumpable liquids and were conveniently applied by pumping into flow lines at the well head or by washing down the casing annulus with water to commingle with well fluids prior to their flow to the surface. These products, however, were effective only at relatively high concentrations and their use added substantially to the cost of production.

Some time ago, it was discovered that certain lightly sulfonated oils, acetylated caster oils and various polyesters, all of which were insoluble in water but soluble in alcohols and aromatic hydrocarbons, were much more effective in breaking emulsions. Accordingly, essentially all commercial demulsifier development has led to production of agents which are insoluble in both water and petroleum oils and have other properties to be described below which cause them to spread at oil-water interfaces to form very thin, mobile films which displace any emulsifying agent present in the oil to allow coalescence of dispersed water droplets. Generally, such interfacially active compounds and hereafter referred to as Thin Film Spreading Agents, or "TFSA's". In the past, these have had to be compounded with and dissolved in alcohols or highly aromatic hydrocarbon solvents in order to produce readily applied liquid compositions. A wide variety of such compositions are required to treat the many different emulsions encountered throughout the world.

While present TFSA compositions are highly effective, being, perhaps, up to fifty to a hundred times more effective per unit volume than the original water-soluble demulsifiers, they suffer serious practical deficiencies because of their solubility characteristics. For example, alcohols and the aromatic hydrocarbons, which are required for preparation of liquid, pumpable compositions, are quite expensive, today approaching in cost that of the active demulsifier ingredient itself. Further, such solvents are flammable and thus create safety problems and entail more expense in shipping, storing and use. The low flash point flammability can be improved by using high boiling aromatic solvents, but these are increasingly rare, expensive and dangerous from the standpoint of carcinogenicity and dermatological effects.

Still further, present demulsifiers cannot generally be used in a subterranean oil or gas well, injection well, or the like, since they cannot be washed down with either water (or brine) or a portion of the produced oil, and, being viscous liquids which are required in very small amounts, they cannot be reliably and continuously delivered several thousand feet down at the fluid level in a typical well without use of elaborate and expensive delivery means.

Other applications of TFSA compositions would be facilitated if they were readily soluble or dispersible in water. For example, much heavy, viscous oil is produced in the United States by steam injection procedures. Typically, wet steam is injected into the oil producing strata for several weeks in order to heat the oil, lower its viscosity and increase reservoir energy. Steam injection is then stopped and oil is flowed or pumped from the bore hole which was used for steam injection. Much of the water resulting from condensation of the steam is also produced with the oil in emulsified form. Since emulsions are more viscous than the external phase at the same temperature, and thus create increased resistance to flow, productivity of the steamed wells can be improved by injecting a water-soluble demulsifier into the wet steam during the steam injection period to prevent emulsion formation. See, for example, U.S. Pat. No. 3,396,792, dated Apr. 1, 1966, to F. D. Muggee. At present, the requirement of water solubility seriously limits the choice of demulsifiers for use in steam or water injection to the relatively inefficient compositions.

As disclosed in my co-pending applications, Ser. No. 045,479, filed June 4, 1979 and entitled "Method Of Recovering Petroleum From A Subterranean Reservoir Incorporating A Polyether Polyol", Ser. No. 45,478, filed June 4, 1979, now U.S. Pat. No. 4,260,019, and entitled "Method of Recovering Petroleum From A Subterranean Reservoir Incorporating Resinous Polyalkylene Oxide Adducts", Ser. No. 45,360, filed June 4, 1979, now U.S. Pat. No. 4,216,828, and entitled "Method Of Recovering Petroleum From A Subterranean Reservoir Incorporating An Acylated Polyether Polyol", and Ser. No. 45,470, filed June 4, 1979, and entitled "Method of Recovering Petroleum From A Subterranean Reservoir Incorporating Polyepoxide Condensates Of Resinous Polyalkylene Oxide Adducts And Polyether Polyols", TFSA's are useful in processes for enhanced recovery of petroleum. Used in such processes involving displacement of residual oil by aqueous solutions, polymer solutions and other aqueous systems, these agents act to increase the amount of oil recovered. Such action possibly arises from their ability to further water wetting of reservoir rock, lessen the viscosity of the oil-water interfacial layer and promote coalescence of dispersed droplets of either water or oil in the other phase.

By use of the present aqueous micellar solutions, the introduction of TFSA into aqueous displacement of flooding fluids is greatly facilitated. In addition, the present micellar solutions, per se, or in combination with other components, can be used as the flooding agent or as a pretreating bank or slug ahead of other aqueous fluids.

Other applications for the present TFSA micellar solutions include their use as flocculation aids for finely ground hematite and magnetite ores during the desliming step of ore beneficiation, as additives for improving the oil removal and detergent action of cleaning compositions and detergents designed for use on polar materials, for the improvement of solvent extraction processes such as those used in extraction of antibiotic products from aqueous fermentation broths with organic solvents, for the improvement of efficiency and phase separation in the purification and concentration of metals by solvent extraction with organic solutions of metal complex-forming agents, and as assistants to improve the wetting and dying of natural and synthetic fibers and for other processes normally involving the interface between surfaces of differing polarity or wetting characteristics.

SUMMARY OF THE INVENTION

A primary object of the present invention is to provide aqueous, liquid compositions of these TFSA's having new and useful characteristics which allow production of: petroleum emulsion breakers and emulsion preventing compositions free or relatively free of highly flammable and environmentally objectionable aromatic hydrocarbons; compositions having a comparatively low cost; compositions which are soluble or dispersible in water and which, therefore, can often be applied by more effective methods than can existing products; compositions which can be used in enhanced recovery operations such as steam flooding and aqueous medium flooding where present products cannot be readily applied; and compositions which can be compounded with water-soluble reagents of other types, such as corrosion inhibitors, wetting agents, scale inhibitors, biocides, acids, etc., to provide multipurpose compounds for use in solving many oil well completion, production, transportation and refining problems.

In accordance with the present invention, these aims are accomplished by means of amphipathic agents which are capable of forming micellar solutions and which by this mechanism or other undefined actions, combined with those of a second essential component which will be referred to as a hydrotropic agent, are able to form homogeneous aqueous solutions containing a relatively wide range of concentrations of TFSA.

DESCRIPTION OF THE PREFERRED EMBODIMENTS

The TFSA compositions of the present invention can be broadly categorized by the following general characteristics:
1. Solubility in water and isooctane at about 25° C. is less than about 1% by volume;
2. Solubility parameter at about 25° C. is in the range of from between about 6.8 to about 8.5, with a majority in the range of from between 7.0 and about 7.9; and
3. Spread at the interface between white, refined mineral oil and distilled water to form films having a calculated thickness no greater than about 20 Angstroms at a spreading pressure of about 16 dynes per cm.

TFSA compositions having these properties are generally organic polymers or semi-polymers having molecular weights ranging from about 2,000 to about 100,000 and having structures containing a multiplicity of distributed hydrophilic and hydrophopic moieties arranged in linear or planar arrays which make them surface active and lead to their adsorption at oil-water interfaces to form very thin films.

Unlike most commonly encountered surface-active compounds, the present TFSA appears to be incapable of forming a micelle in either oil or water. The distributed and alternating occurrence of polar and nonpolar or hydrophilic and hydrophobic groups in the molecule apparently prevents the kind of organization required for micelle formation and thus impairs dispersion or solution in either water or low polarity organic solvents.

The TFSA's useful in the present invention have the previously recited properties:
1. The solubility in water and in isooctane at about 25° C. is less than about 1% by volume.
   Solubility tests may be run by placing a 1 ml sample (or the weight of solid product calculated to have a volume of 1 ml) in a graduated cylinder of the type which may be closed with a ground glass stopper. Thereafter place 99 ml of water in the cylinder, close, place in a 25° C. water bath until thermal equilibrium is reached, and remove from the bath and shake vigorously for one hour. Return the sample to the bath for five minutes and then repeat the shaking procedure. Finally, return the sample to the bath and allow it to stand quietly for one hour. The cylinder contents should be carefully examined and any cloudiness or opacity of the liquid phase or the appearance of any sediment or undissolved material in the cylinder noted, thus indicating that the sample satisfied the requirement for insolubility in water.
   Isooctane solubility is determined similarly by substituting this hydrocarbon for the water used above.
2. The Solubility Parameter (S.P.) at about 25° C. is from between about 6.9 and about 8.5, inclusive.
   Methods of determination of solubility parameter are disclosed in Joel H. Hildebrand, "The Solubility of Nonelectrolytes", Third Edition, pgs. 425 et seq. However, a simplified procedure, sufficiently accurate for qualification of a useful TFSA composition may be utilized. Components of a give solubility parameter are generally insoluble in hydrocarbon (non-hydrogen-bonding) solvents having a lower solubility parameter than themselves. Therefore, the present composition should be soluble in a hydrocarbon solvent of a solubility parameter of about 6.8. Since the solubility parameter of mixtures of solvents is an additive function of volume percentage of components in the mixture, test solutions of the desired solubility parameters may be easily prepared by blending, for example, benzene (S.P. 9.15) and isooctane (S.P. 6.85) or perfluoro-n-heptane (S.P. 5.7).

A mixture of about 72 parts of benzene with about 28 parts of isooctane will provide a solvent having a solubility parameter of about 8.5 at room temperature (about 25° C.). Perfluoro-n-heptane has a solubility parameter of about 5.7 at 25° C., so a mixture of 68 parts of this solvent with 32 parts of benzene provides a solvent with a solubility parameter of about 6.8, or isooctane of a solubility parameter 6.85 may be used.

When 5 ml of the TFSA are mixed with 95 ml of an 8.5 solubility parameter solvent at room temperature, a clear solution should result. When 5 ml of TFSA is mixed with a 6.85 solubility parameter solvent, a cloudy mixture or one showing phase separation should result. Solvent mixtures have a solubility parameter between about 7.0 and about 7.9 may be prepared as described above and utilized in a similar test procedure.

In interpreting the solubility parameter and other tests, it should be recognized that the TFSA consists not of a single material or compound but a cogeneric mixture of products containing a range of products of molecular weights distributed around the average molecular weight and even containing small amount of the starting compounds employed in the synthesis. As a result, in running solubility and solubility parameter tests, very slight appearances of cloudiness or lack of absolute clarity should not be interpreted as a pass or a failure to pass the criteria. The intent of the test is to ensure that the bulk of the cogeneric mixture, i.e., 75% or more, meets the requirement. When the results is in doubt, the solubility test may be run in centrifuge tubes allowing subsequent rapid phase separation by centrifuging, after which the separated non-solvent phase can be removed, any solvent contained in it can be evaporated, and the actual weight or volume of separated phase can be determined.

3. The TFSA should spread at the interface between distilled water and refined mineral oil to form films with thickness no greater than about 20 Angstroms (0.0020 micrometer) at a spreading pressure of about 16 dynes per cm (0.016 Newton per meter).

Suitable methods of determining film pressure are disclosed in N. K. Adam, "Physics and Chemistry of Surfaces", Third Edition, Oxford University Press, London, 1941, pgs. 20 et seq, and C. M. Blair, Jr., "Interfacial Films Affecting The Stability of Petroleum Emulsions", *Chemistry and Industry (London)*, 1960, pgs. 538 et seq. Film thickness is calculated on the assumption that all of the TFSA remains on the area of interface between oil and water on which the product or its solution in a volatile solvent has been placed. Since spreading pressure is numerically equal to the change in interfacial tension resulting from spreading of a film, it is conveniently determined by making interfacial tension measurements before and after adding a known amount of TFSA to an interface of known area.

Alternatively, one may utilize an interfacial film balance of the Langmuir type such as that described by J. H. Brooks and B. A. Pethica, *Transactions of the Faraday Society* (1964), p. 20 et seq, or other methods which have been qualified for such interfacial spreading pressure determinations.

In determining the interfacial spreading pressure of the TFSA products, I prefer to use as the oil phase a fairly available and reproducible oil such as a clear, refined mineral oil. Such oils are derived from petroleum and have been treated with sulfuric acid and other agents to remove nonhydrocarbon and aromatic constituents. Typical of such oils is "Nujol", distributed by Plough, Inc. This oil ranges in density from about 0.85 and 0.89 and usually has a solubility parameter between about 6.9 and about 7.5. Numerous similar oils of greater or smaller density and viscosity are commonly available from chemical supply houses and pharmacies.

Other essentially aliphatic or naphthenic hydrocarbons of low volatility are equally usable and will yield similar values of spreading pressure. Suitable hydrocarbon oils appear in commercial trade as refined "white oils", "textile lubricants", "paraffin oil", and the like. Frequently, they may contain very small quantities of alpha-tocopherol (Vitamin E) or similar antioxidants which are oil-soluble and do not interfere with the spreading measurements.

While the existence of micelles and of oily or aqueous micellar solutions have been known for some time (see, e.g., "Surface Activity", Moilliet, Collie and Black, D. Van Nostrand & Co., New York (1961)) and are probably involved in many operations involving detergency where either oily (nonpolar) or earthy (highly polar) soil particles are to be removed, their utility in cooperation with hydrotropic agent for the present purposes is an unexpected and unpredictable discovery.

In U.S. Pat. No. 2,356,205, issued Aug. 22, 1944, to Chas. M. Blair, Jr. & Sears Lehman, Jr., a wide variety of micellar solutions designed to dissolve petroleum oils, bitumen, wax, and other relatively nonpolar compounds are described for purposes of cleaning oil formation faces and for effecting enhanced recovery of petroleum by solution thereof. At this early date, however, the use of micellar principles was not contemplated for the preparation of solutions of the reltively high molecular weight demulsifiers.

However, some of the principles disclosed in the above patent, omitting the main objective therein of dissolving relatively large amounts of hydrocarbons, chlorinated hydrocarbons, and the like, are applicable to preparation of the present compositions.

The four necessary components of the micellar solutions of TFSA are:

1. A micelle-forming amphipathic agent. Such may be anionic, cationic, or nonionic and, if anionic or cationic, may be either in salt form or as the free acid or free base or mixtures thereof.

2. A hydrotropic agent. This is a small to medium molecular weight semi-polar compound containing oxygen, nitrogen or sulfur and capable of forming hydrogen bonds. It is believed that such agents cooperate in some manner with the amphipathic agent to form clear or opalescent, stable compositions.

3. Water.

4. TFSA, having the properties recited above.

In addition to these components, the micellar solutions may contain, but are not required to contain, salts, hydrocarbons, or small amounts of other inorganic or organic material. Such constituents may be impurities, solvents, or by-products of syntheses used in forming the hydrotropic agent, or may be additions found useful in forming the composition of this invention. As an example of the latter, small amounts of inorganic salts such as NaCl, $Na_2SO_4$, $KNO_3$, $CaCl_2$, and the like, are sometimes helpful in promoting homogeneity with a minimum of amphipathic and hydrotropic agents. They may also yield compositions of lower freezing point, a property useful when the composition is employed in cold climates. Similarly, ethylene glycol, methanol, ethanol, acetic acid, or similar organic compounds may be incorporated into the compositions to improve physical properties such as freezing point, viscosity, and density, or to improve stability.

As stated above, the micelle-forming amphipathic agents which may be used in preparing the aqueous solutions herein contemplated may be either cation-active, anion-active, or of the nonelectrolytic type. Amphipathic agents generally have present at least one radical containing about 10 or more carbon atoms and not more than about 64 carbon atoms per molecule. This is true of the amphipathic agents employed in the present invention as a component of the vehicle or solvent or dispersant employed in the present compositions. The hydrophobic portions of these agents may be aliphatic, alicyclic, alkylalicyclic, aromatic, arylalkyl, or alkylaromatic. The preferred type of agents are those in which the molecule contains a long, uninterrupted carbon chain containing from 10 to 22 carbon atoms in length. Examples of suitable anion-active amphipathic agents include the common soaps, as well as materials such as sodium cetyl sulfate, ammonium lauryl sulfonate, ammonium di-isopropyl naphthalene sulfonate, sodium oleyl glyceryl sulfate, mahogany and green sulfonates from petroleum or petroleum fractions or extracts, sodium stearamidoethyl sulfonate, dodecylbenzene sulfonate, dioctyl sodium sulfosuccinate, sodium naphthenate, and the like. Other suitable sulfonates are disclosed and taught in U.S. Pat. No. 2,278,171, issued Feb. 17, 1942, to De Groote and Keiser.

Suitable cation-active compounds include cetyl pyridinium chloride, stearamidoethyl pyridinium chloride, trimethyl-heptadecyl ammonium chloride, dimethyl-pentadecyl sulfonium bromide, octadecylamine acetate, and 2-heptadecyl-3-diethylene diaminoimidazoline diacetate.

Suitable nonelectrolytic amphipathic agents include the oleic acid ester of nonaethylene glycol, the steric acid ester of polyglycerol, oxyethylated alkylphenols, and long chain alcohol ethers of polyethylene glycols.

It is of course, well known that amphipathic compounds are readily and commercially available, or can be readily prepared to exhibit the characteristics of more than one of the above mentioned types. Such compounds are disclosed in U.S. Pat. No. 2,262,743, dated Nov. 11, 1941, to De Groote, Keiser and Blair. For convenience, in such instances where a surface-active material may show the characteristics of more than one of the above described types, it is understood that it may be classified under either or both types.

The mutual solvent or hydrotropic agents of the solution utilized in the present invention are characterizable as compounds of a hydrophobic hydrocarbon residue of comparatively low molecular weight combined with a hydrophilic group of low molecular weight and are free from surface-active properties. The hydrophobic residue may contain from 2 to 12 carbon atoms and may be alkyl, alicyclic, aromatic, or alkyl substituted alicyclic or aromatic, or may be the hydrocarbon portion of a heterocyclic or hydrocarbon substituted heterocyclic group. The hydrocarbon residue may have branched or normal chain structure, but no branch may have a length of more than 7 carbon atoms from the point of attachment to the hydrophilic residue, counting a benzene or cyclohexyl group as being equivalent in length to an aliphatic chain of three carbon atoms. Where the hydrocarbon residue consists of not more than 4 carbon atoms, structures of the normal primary alkyl type are preferred. Where the residue is made up of more than four carbon atoms, then structures of secondary and tertiary types are also good where the second and third branches may be methyl or ethyl groups.

This hydrophobic hydrocarbon residue is combined either directly or indirectly with a hydrophilic group of one of the following groups:

(a) A hydroxyl group which may be alcoholic, phenolic, or carboxylic;

(b) An aldehyde group;

(c) A carboxy amide group;

(d) An amine salt group;

(e) An amine group; and (f) An alkali phenolate group.

By "indirectedly combined with one of these groups" is meant that the hydrocarbon residue is combined as by etherification, esterification, or amidification, or the like, with another organic residue which contains not more than four carbon atoms and also one or more of the hydrophilic groups named above, provided that after said combination, at least one of the hydrophile groups remains free. Specific examples illustrating this class of compounds are: Ethyl alcohol, n-amyl alcohol, alphaterphineol, p-cresol, cyclohexanol, n-butyraldehyde, benzaldehyde, n-butyric acid, glycol mono-butyrate, propyl lactate, mono n-butyl amine hydrochloride, n-propionamid, ethylene glycol mono n-butyl amine hydrochloride, n-propionamid, ethylene glycol mono n-butyl ether, pyridine, methylated pyridine, piperidine, or methylated piperidines.

The solubilizer (mutual solvent or hydrotropic compound above described) is essentially a semi-polar liquid in the sense that any liquid whose polar character is no greater than that of ethyl alcohol and which shows at least some tendency to dissolve in water, or have water dissolved in it, is properly designated as semi-polar.

The solubilizer or semi-polar liquid indicated may be illustrated by the formula X—Z, in which X is a radical having 2 to 12 carbon atoms, and which may be alkyl, alicyclic, aromatic, alkylalicyclic, alkylaryl, arylalkyl, or alicyclicalkyl in nature, and may, furthermore, include heterocyclic compounds and substituted heterocyclic compounds. There is the added limitation that the longest carbon atom chain must be less than eight carbon atoms, and that, in such characterization, cyclic carbon atoms must be counted as one-half. Z represents:

—OH;

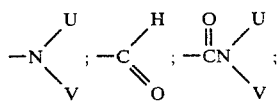

—COOH; or —OMe where U and V are hydrogen or a hydrocarbon substituent and Me is an alkalie metal;

if X is a cyclic teritary amine nucleus;

>NH if X is a cyclic secondary amine nucleus.

The semi-polar liquid also may be indicated by the following formula: $X-Y-R-(Z)_n$. Here X and Z have their previous significance, R is —CH$_2$—,—C$_2$H$_4$—,—C$_3$H$_5$=; —C$_3$H$_6$— or
—C$_2$H$_4$—O—C$_2$H$_4$— and n is either one or two as the choice of R demands. Y is one of the following:

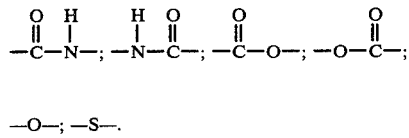

—O—; —S—.

In general, these hydrotropic agents are liquids having dielectric constant values between about 6 and about 26, and have at least one polar group containing one or more atoms of oxygen, and/or nitrogen. It is significant, perhaps, that all of the solubilizers are of types known to be able to form hydrogen bonds.

The choice of solubilizer or common solvent and its proportion in the mixture depends somewhat upon the amphipathic agent used, the amount and kind of TFSA used, and the proportion of water used, and is best determined by preparing experimental mixtures on a small scale.

In some cases, it is desirable to include in the solution small amounts of acid, alkali, or inorganic salts, as it has been found that the presence of these electrolytes often gives solutions having greater stability and a wider range of miscibility with water and organic material. Excess acid, when used, will usually be in solutions containing a cation-active or nonelectrolytic wetting agent, but not exclusively so. Excess alkali, when used, will usually be in a solution containing anion-active wetting agents, but, again, not exclusively.

The polyether polyol or TFSA utilized in this invention is generally an organic polymer or semi-polymer with an average molecular weight above about 800 and below about 30,000 and has a structure which will allow orientation on polar surfaces with much or most of the elements of the molecule in a thin plane. To be effectively adsorbed at oil-water or oil-rock interfaces and subsequently to be desorbed at water-rock interfaces, the TFSA must generally contain constituents which give it a highly distributed hydrophile and hydrophobe character, and without such concentrations of either hydrophilic or hydrophobic groups as to produce water solubility or oil solubility, in the ordinary macroscopic sense. The TFSA also appears to differ from formerly used surfactants in that the effects on oil-water interfacial tensions as a function of concentration are limited. While spreading efficiently at such interfaces to form thin films with spreading pressures up to about 35 to 40 dynes per cm, addition or larger amounts of TFSA have relatively little effect on interfacial tension. Also, the present TFSA constituent of the micellar solution in contrast to formerly used surfactants, has relatively little or no tendency to stabilize either oil-in-water or water-in-oil emulsions when present in normal use amounts.

Usually the TFSA constituents applicable to the practice of the invention are organic molecules containing carbon, hydrogen and oxygen, although in some instances they may also contain sulfur, nitrogen, silicon, chlorine, phosphorous or other elements. Small amounts of inorganic material such as alkalies, acids or salts may appear in the compositions as neutralizing agents, catalyst residues or otherwise. The critical requirements for the TFSA compositions are not so much compositional as structural and physical. They must be made up of hydrophilic (polar) moieties, usually ones capable of forming hydrogen bonds, such as hydroxyl, carbonyl, ester, ether, sulfonium, amino, ammonium, phospho or similar hydrogen bonding groups, connected by or to hydrophobic groups, such as alkylene, alkyl, cycloaklyl, aryl, arylene, aralkyl, polyalkylene, polyalkylyne, combinations of such groups and such groups containing relatively non-polar substituents, such as hydrocarbon, chlorine, fluorine and the like. Sometimes the hydrophobic moieties are larger and contain more atoms than the polar groups in the molecule, having a minimum of two carbon atoms in each group and up to as many as 36 carbon atoms, although the actual ratio of sizes depends greatly on the structure of the hydrophilic moiety. Most commonly, the hydrophobic groups will contain 14 to 22 carbon atoms and will have linear or sheet-like conformations allowing for relatively flat orientation on surfaces.

Polar moieties other than hydrogen bonding ones are not excluded from these compositions and, indeed, may be deliberately included in some structures to improve adsorption and interfacial spreading tendencies. For example, quaternary ammonium groups, while incapable of forming hydrogen bonds, can improve spreading and interfacial adsorption in some applications by way of their highly ionized form which imparts cationic character to the molecules in which they occur and, via coulombic repulsion effects, can improve spreading in a film.

Generally, the TFSA constituents will contain at least two each of the required hydrophilic (polar) and hydrophobic moieties per molecule and commonly will contain many more of each. The effective products, however, must have the three properties described above.

While, as pointed out above, the effective TFSA may be derived from a wide variety of chemical reactants and may contain numerous different groups or moieties, I have found that particularly effect products are those which are described as a polyepoxide condensate of at least one of: (1) a polyalkylene oxide adduct of a fusible, water-insoluble organic aromatic hydrocarbon solvent-soluble synthetic resin, wherein said resin has from between about 4 to about 15 phenolic groups and is an alkyl or cycloaliphatic substituted phenol-aldehyde condensate of an ortho- or para-substituted phenol and an aldehyde, said condensate resin being thereafter further condensed with an alkylene oxide containing less than about five carbon atoms in an amount equal to at least one mole of alkylene oxide per phenolic moiety of said resin; and (2) a polyether polyol having the formula:

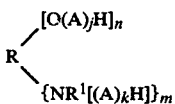

wherein:
A is an alkylene oxide groups, $-C_iH_{2i}O-$;
O is oxygen;
i is a positive integer from 2 to about 10;
j is a positive integer no greater than about 100;
k is a positive integer no greater than about 100;
N is nitrogen;
$R^1$ is one of hydrogen, a monovalent hydrocarbon group containing less than about $C_{11}$, or $[A_LH]$;
L is a positive integer no greater than about 100;
R is a hydrocarbon moiety of a polyol, a primary or secondary amine, a primary or secondary polyamine, a primary or secondary amine alcohol, or hydrogen; and
m+n is no greater than about 4 when R is other than hydrogen and one of m and n is zero and the other is unity when R is hydrogen. These polyepoxide condensates must conform to the physical property parameters set forth above.

The polyalkylene oxide adducts are broadly described in U.S. Pat. No. 2,499,365, entitled "Chemical Manufacture", dated Mar. 7, 1950, to DeGroote, et al. These compositions also include materials wherein less than one or two alkylene oxide units may be reacted with each reactive structural group of the starting resin.

The most common resin is an alkyl or cycloaliphatic substituted phenol-aldehyde resin prepared by condensing an ortho- or para-substituted phenol with an aldehyde, most commonly with formaldehyde or a formaldehyde progenitor such as paraformaldehyde or trioxane, under mildly alkaline or acidic conditions to form a fusible and xylene-soluble polymer of low or moderate molecular weight and which typically will contain from between about 4 to about 12 phenolic groups. This resin is then condensed, usually with an alkaline catalyst, with an alkylene oxide or a mixture of alkylene oxides.

Alkylene oxides suitable for use in preparing the compositions used in the present process include ethylene oxide, propylene oxide, butylene oxide, 2-3-epoxy-2-methyl butane, trimethylene oxide, tetrahydrofuran, glycidol, and similar oxides containing less than about 10 carbon atoms. Because of their reactivity and relatively low cost, the preferred alkylene oxides for preparing effective TFSA's are the 1,2-alkylene oxides (oxiranes) exemplified by ethylene oxide, propylene oxide and butylene oxide. In the preparation of many TFSA's, more than one alkylene oxide may be employed either as mixtures of oxides or sequentially to form block additions of individual alkylene oxide groups.

To be suitable for use in the present process, addition and condensation of oxide must not be carried to the point of producing water-soluble products. Where ethylene oxide alone is condensed with the resin, the amount added preferably will be between one and five moles per phenolic moiety in the resin. The actual amount will vary with the size of the alkyl or cycloalkylene group attached to the phenol ring as well as, apparently, with the composition and properties of the oil, aqueous phase and rock formation encountered in the method.

Where propylene or butylene oxides or mixtures of one or both of these with ethylene oxide are condensed with the phenolic resin intermediate, generally a greater amount of such oxides may be reacted without leading to extremely polar, water-insoluble products. In contrast, the amount of epichlorohydrin or glycerol chlorohydrin which can be condensed without producing agents not meeting the solubility and interfacial spreading criteria defined above is usually somewhat lower.

On a solvent-free weight basis, the amount of alkylene oxide or mixture of oxides condensed with the resin will fall within the range of about one part oxides to about 10 parts of resin and up to from between about 1-to-5 and about 3-to-1. The final product should contain at least about one mole of alkylene oxides per phenolic moiety of the resin.

Compositions incorporated within the scope of the formula set forth above for the polyether polyol contain an average of about 1½ or more hydroxyl groups per molecule and are generally composed of a cogeneric mixture of products obtained by condensing alkylene oxides with smaller molecules containing two or more reactive hydrogens as part of hydroxyl or amino groups.

Representative of these compositions is polypropylene glycol, having an average molecular weight of about 1,200, to which about 20% by weight of ethylene oxide has been added. Such a polyether glycol is theoretically obtainable by condensing about 20 moles of propylene oxide with about one mole of water, followed by addition of about six moles of ethylene oxide. Alternatively, one may condense about 20 moles of propylene oxide with a previously prepared polyethylene glycol of about 240 average molecular weight.

Other suitable dihydric alcohols may be obtained by condensing alkylene oxides or mixtures of oxides or in successive steps (blocks) with difunctional (with respect to oxide addition) compounds, such as ethylene glycol, methyl amine, propylene glycol, hexamethylene glycol, ethyl ethanolamine, analine, resorcinol, hydroquinone and the like.

Trihydric ether alcohols may be prepared by condensation of ethylene, propylene or butylene oxides with, for example, glycerin, ammonia, triethanolamine, diethanolamine, ethyl ethylene diamine or similar smaller molecules containing three hydrogens capable of reacting with alkylene oxides. Similarly, polyether alcohols with a multiplicity of hydroxyl groups may be obtained by condensing alkylene oxides with multireactive starting compounds, such as pentaerythritol, glycerol, N-monobutyl ethylene diamine, trishydroxymethylaminomethane, ethylene diamine, diethylenetriamine, diglycerol, hexamethylene diamine, decylamine and cyclohexylamine. DeGroote, in U.S. Pat. No. 2,679,511, describes a number of amino derived polyols which he subsequently esterfies. Product 15-200, manufactured and sold by the Dow Chemical Company, and derived by oxyalkylation of glycerol with a mixture of ethylene and propylene oxides, is an example of a commercially available polyol of the kind contemplated herein.

Generally, these compositions will have average molecular weights of 15,000 or less and will be derived from reactive hydrogen compounds having 18 or fewer carbon atoms and 10 or fewer reactive hydrogens.

Other general descriptions of suitable polyether polyols coming within the scope of the structure detailed above, along with methods for carrying out the actual manufacturing steps, are disclosed in "High Polymers, Vol XIII, Polyethers," edited by N. G. Gaylord, John Wiley & Sons, New York, 1963.

Suitable polyepoxide for condensation with the compounds set forth above include, particularly, the diglycidyl ether of dihydroxyphenyl-methylmethane and the lower polymers thereof, which may be formed as co-generic mixtures and which have the general formula:

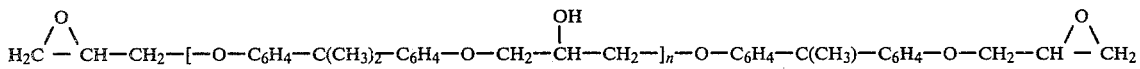

wherein n is zero of a positive integer or less than about 6.

Other polyepoxides containing two or more oxirane or epoxy groups, such as diisobutenyl dioxide, polyepoxypolyglycerols, epoxidized linseed oil, epoxidized polybutadiene or the like, may also be employed.

The compositions suitable for practicing the present invention are prepared by reacting formaldehyde or a substance which breaks down to formaldehyde under the reaction conditions, e.g., paraformaldehyde and trioxane, and a difunctional, with respect to reaction with formaldehyde, alkyl phenol, often a crude mixture of alkyl phenols for economic reasons, by heating the reactants between about 100° and about 125° C. in the presence of a small amount of an acid catalyst such as sulfamic acid or muriatic acid or, alternatively, in the presence of an alkaline catalyst such as sodium hydroxide or sodium methylate and, preferably, under substantially anhydrous conditions, excepting the water produced during the reaction. The aqueous distillate which begins to form is collected and removed from the reaction mixture. After several hours of heating at temperatures slightly above the boiling point of water, the mass becomes viscous and is permitted to cool to about 100°-105° C. At this point, an aromatic hydrocarbon fraction such as xylene may be added, and heating is resumed. Further aqueous distillate begins to form, and heating is continued for an additional number of hours until at least about one mole of aqueous distillate per mole of the formaldehyde has been distilled off. Xylene or other hydrocarbon which may be distilled with the water is returned to the reaction mass. The temperature at the end of the reaction reaches about 180°-250° C. The product is permitted to cool to yield the phenol-formaldehyde condensation product in the aromatic solvent.

The molecular weight of these intermediate condensation products cannot be ascertained with certainty, but it is estimated that the resins employed herein should contain from between about 4 to about 15, preferably from about 4 to about 6, phenolic nuclei per resin molecule. The solubility of the condensation product in hydrocarbon solvent would indicate that the resin is a linear or sheet-like polymer, thus distinguishing it from the more common phenol-formaldehyde resins of the insoluble crosslinked type.

Having prepared the intermediate phenol-formaldehyde products, the next step is the oxyalkylation of the condensation products with alkylene oxide. This is achieved by mixing the intermediate phenol-formaldehyde condensation product as is or contained in the aromatic solvent with a small amount of a suitable catalyst, usually potassium hydroxide or sodium methylate, in an autoclave. The condensation product is heated above 100° C., and ethylene oxide, propylene oxide, butylene oxide or mixtures of two or all three of these oxides, either as a mixture or by sequential addition of first either one or another of the oxides is charged into the autoclave until the pressure is in the vicinity of 75-100 psi.

The reaction mixture is gradually heated until an exothermic reaction begins. The external heating is then removed, and alkylene oxide or oxide mixture is added at such a rate that the temperature is maintained between about 130°-160° C. in a pressure range of 30-100 psi. After all of the alkylene oxide has been added, the temperature is maintained for an additional 10 to 20 minutes to assure substantially complete reaction of the alkylene oxide. The resulting product is the alkylene oxide adduct of an alkyl phenol-formaldehyde condensation product, in which the weight ratio of the oxide to the condensation product (on a solvent-free basis) is between about 1-to-10 and about 10-to-1, preferably between about 1-to-5 and about 3-to-1, and containing at least about one mole of alkylene oxide per phenolic moiety of the resin.

As to the limits of the various constituents of the micellar solutions containing TFSA, the following will serve as a guide, the percentages being by weight:

|  | Percent |
| --- | --- |
| TFSA Constituents | about 5 to about 75 |
| Hydrotropic Agent | about 2 to about 30 |
| Amphipathic Agent | about 2 to about 30 |
| Water | about 15 to about 90 |

Although the exact function of the electrolytes previously referred to is not completely understood, the effect, in part, may be due to the ability to bind water, i.e., to become hydrated. This suggests that certain other materials which are highly hydrophile in character and clearly differentiated from the classes of non-polar solvents and semi-polar solubilizers may be the functional equivalent of an electrolyte. Substances of this class which ordinarily do not dissociate include glycerol, ethylene glycol, diglycerol, sugar, glucose, sorbitol, mannitol, and the like.

Also, as stated above, these solutions may contain other organic constituents such as hydrocarbons. These frequently are used as thinning agents, azetropic distillation aids or reflux temperature controllers in the manufacture of the TFSA constituent and may be left therein when the present micellar solutions are prepared. To the extent that such compounds are present they appear to compete somewhat with the TFSA constituent for micelle space, thus limiting, to some extent, the maximum amount of TFSA constituent which can be brought into homogeneous solution.

Selection of an effective TFSA composition for a given petroleum emulsion and determination of the amount required is usually made by so-called "bottle tests", conducted, in a typical situation, as follows:

A sample of fresh emulsion is obtained and 100 ml portions are poured into each of several 180 ml screw top prescription or similar graduated bottles. Dilute solutions (1% or 2%) of various TFSA constituents are prepared in isopropyl alcohol. By means of a graduated pipette, a small volume of a TFSA solution is added to a bottle. A similar volume of each composition is added to other bottles containing emulsion. The bottles are then closed and transferred to a water bath held at the same temperature as that employed in the field treating plant. After reaching this temperature, the bottles are shaken briskly for several minutes.

After the shaking period, the bottles are placed upright in the water bath and allowed to stand quietly. Periodically, the volume of the separated water layer is recorded along with observations on the sharpness of the oil-water interface, appearance of the oil and clarity of the water phase.

After the standing period, which may range from 30 minutes to several hours, depending upon the temperature, the viscosity of the emulsion and the amount of TFSA compositions used, small samples of the oil are removed by pipette or syringe and centrifuged to determine the amount of free and emulsified water left in the oil. The pipette or syringe used to remove the test samples should be fitted through a stopper or other device which acts as a position guide to insure that all bottles are sampled at the same fluid level.

The combined information on residual water and emulsion, speed of the water separation and interface appearance provides the basis for selection of the generally most effective TFSA constituent. Where none of the results are satisfactory, the tests should be repeated using higher concentrations of TFSA constituents and, conversely, where all results are good and similar, the tests should be repeated at lower concentrations until good discrimination is possible.

In practicing the process for resolving petroleum emulsions of the water-in-oil type with the present micellar solution, such solution is brought into contact with or caused to act upon the emulsion to be treated, in any of the various methods or apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment of demulsification procedure to recover clean oil. In this procedure, the emulsion is admixed with the micellar TFSA solution, for example, by agitating the tank of emulsion and slowly dripping the micellar TFSA solution into the emulsion. In some cases, mixing is achieved by heating the emulsion while dripping in the micellar TFSA solution, depending upon the convection currents in the emulsion to produce satisfactory admixture. In a third modification of this type of treatment, a circulating pump withdraws emulsion from, e.g., the bottom of the tank and reintroduces it into the top of the tank, the micellar TFSA solution being added, for example, at the suction side of said circulating pump.

In a second type of treating procedure, the micellar TFSA solution is introduced into the well fluids at the wellhead, or at some point between the wellhead and the final oil storage tank, by means of an adjustable proportioning mechanism or proportioning pump. Ordinarily, the flow of fluids through the subsequent lines and fittings suffices to produce the desired degree of mixing of micellar TFSA solution and emulsion, although, in some instances, additional mixing devices may be introduced into the flow system. In this general procedure, the system may include various mechanical devices for withdrawing free water, separating entrained water, or accomplishing quiescent settling of the chemically treated emulsion. Heating devices may likewise be incorporated in any of the treating procedures described herein.

A third type of application (down-the-hole) of micellar TFSA solution to emulsion is to introduce the micellar solution either periodically or continuously in diluted form into the well and to allow it to come to the surface with the well fluids, and then to flow the chemical-containing emulsion through any desirable surface equipment, such as employed in the other treating procedures. This particular type of application is especially useful when the micellar solution is used in connection with acidification of calcareous oil-bearing strata, especially if dissolved in the acid employed for acidification.

In all cases, it will be apparent from the foregoing description, the broad process consists simply in introducing a relatively small proportion of micellar TFSA solution into a relatively large proportion of emulsion, admixing the chemical and emulsion either through natural flow, or through special apparatus, with or without the application of heat, and allowing the mixture to stand quiescent until the undesirable water content of the emulsion separates and settles from the mass.

Besides their utility from breaking petroleum emulsions, the present micellar TFSA solutions, as mentioned earlier, may be used to prevent emulsion formation in steam flooding, in secondary waterflooding, in acidizing of oil-producing formations, and the like.

Petroleum oils, even after demulsifications, may contain substantial amounts of inorganic salts, either in solid form or as small remaining brine droplets. For this reason, most petroleum oils are desalted prior to refining. The desalting step is effected by adding and mixing with the oil a few volume percentages of fresh water to contact the brine and salt. In the absence of demulsifier, such added water would also become emulsified without effecting its washing action. The present micellar solutions may be added to the fresh water to prevent its emulsification and to aid in phase separation and removal of salt by the desalting process. Alternatively, if desired, they may be added to the oil phase as are present aromatic solvent compositions.

Most petroleum oil, along with its accompanying brines and gases, is corrosive to steel and other metallic structures with which it comes in contact. Well tubing, casing, flow lines, separators and lease tanks are often seriously attacked by well fluids, especially where acidic gases such as $H_2S$ or $CO_2$ are produced with the liquids, but also in systems free of such gases.

It has been known for some time, and as exemplified in U.S. Pat. No. 2,466,517, issued Apr. 5, 1949, to Chas. M. Blair and Wm. F. Gross, that such corrosive attack of crude oil fluids can be mitigated or prevented by addition to the fluids of small amounts or organic inhibitors. Effective inhibitors compositions for this use are usually semi-polar, surface active compounds containing a nonpolar hydrocarbon moiety attached to one or more polar groups containing nitrogen, oxygen or sulfur or combinations of such elements. Generally these inhibitors or their salts are soluble in oil and/or water (brine) and frequently appear to be able to form micelles in one or both of these phases. Typical inhbitors include amines such as octyl amine, dodecyl amine, dioctodecyl amine, butyl naphthyl amine, dicyclohexyl amine, benzyl dimethyldodecyl ammonium chloride, hexadecylaminopropyl amine, declyoxypropyl amine, mixed amines prepared by hydrogenation of nitrile derivatives of tall oil fatty acids, soya acid esters of monoethanol amine, 2-undecyl, 1-amino ethyl imidazoline and a wide variety of cationic nitrogen compounds of semi-polar character. Also effective in some applications are nonyl succinic acid, diocylnaphthalene sulfonic acid, trimeric and dimeric fatty acids, propargyl alcohol, mercaptobenzothiozole, 2, 4, 6-trimethyl-1, 3, 5-trithiaane, hexadecyldimethyl benzimidazolium bromide, 2-thiobutyl-N-tetrodecylpyridinium chloride, tetrahydronaphthylthiomorpholine, and the like.

In contrast to the TFSA, corrosion inhibits appear to function by forming on the metal surface strongly adherent, thick, closely packed films which prevent or lessen contact of corrosive fluids and gases with the metal and interfere with ionic and electron transfer reactions involved in the corrosion process.

Corrosion inhibitors are quite commonly introduced down the casing annulus of oil wells where they commingle with the well fluids before their travel up the well tubing and thus can effectively prevent corrosion of well equipment. Where corrosive attack occurs at the surface, the inhibitor may be introduced at or near the well head, allowing it to adsorb on the flow lines and surface equipment to insure protection.

Addition of inhibitor at either downhole or surface locations may be combined conveniently with demulsifier addition since the latter is also frequently introduced in one of these locations.

Inhibitors such as those mentioned above, may generally be incorporated into the TFSA micellar solutions, replacing a portion of or in addition to the TFSA constituent. Also, since many of these inhibitors are themselves micelle-forming amphipathic agents, they may be included in the micellar solution as such, replacing other amphipathic agents which might be otherwise utilized. Combining the micellar solution with corrosion inhibitor permits more economic chemical treatment by reducing inventory to one compound, requiring only one chemical injection system rather than two and lessening the labor and supervision required.

Still another important effect of using the micellar solution of TFSA and corrosion inhibitor results from the prevention of emulsification by the inhibitor. Frequently, it has been found that inhibitor in the amount required for effective protection causes the formation of very refractive emulsions of water and hydrocarbon, especially in systems containing light, normally nonemulsifying hydrocarbons such as distillate, casing head gasoline, kerosene, diesel fuel and various refinery fractions. Inhibitors are commonly used in refinery systems where emulsification is highly objectionable and where the compositions could be designed to include an effective emulsion preventative micellar solution of TFSA.

Inhibitor use may range from a few to several hundred parts per million based on the oil to be treated, depending upon the severity of corrosion. For a given oil field or group of wells, tests wil normally be run to determine the requirement for micellar solution of TFSA and for inhibitor and a composition incorporating these components in approximately the desired ratio will be prepared. In some instances, the requirement for micellar solution of TFSA in the best concentration may result in use of corrosion inhibitor, employed as micelle-former, in some excess over that required for inhibition. This will not affect the utility of the micellar solution and will provide a comfortable excess of inhibition which can be helpful during the periods when higher corrosivity may be encountered.

Examples of micellar solutions employing TFSA with inhibitor in water dispersible, micellar solutions are given below.

Selection of the proper corrosion inhibitor for a given system or oil is usually made by conducting laboratory tests under conditions simulating those encountered in the well or flowline. Such tests are exemplified by that described in Item No. 1K155, "Proposed Standardized Laboratory Procedure for Screening Corrosion Inhibitors for Oil and Gas Wells", published by the National Association of Corrosion Engineers, Houston, Tex.

EXAMPLES OF THIN FILM SPREADING AGENTS

EXAMPLE IA

RESINOUS POLYALKYLENE OXIDE ADDUCT PRECURSER

Reference is made to U.S. Pat. No. 2,499,365, to M. De Groote, issued Mar. 7, 1950, which describes generally the manufacture of demulsifiers by the oxyalkylation of fusible, organic solvent-soluble, alkylphenol resins. The procedure of Example 74a of this patent was followed to prepare a fusible, xylene soluble p-dodecylphenol resin in xylene solution. The acid catalyst was neutralized, water was removed by azetropic distillation of some zylene and 0.5% by weight of sodium methylate catalyst was added. Using the procedure of Example 1b of the cited patent, 25% by weight of ethylene oxide, based on the final batch weight, was added and reacted with the resin.

EXAMPLE IB

FINAL PRODUCT PREPARATION

Reference is made to U.S. Pat. No. 3,383,325 to V. L. Seale, et al, dated May 14, 1968, which described demulsifiers prepared by condensing polyether polyols and oxyalkylated alkylphenol resins with diglycidyl ethers of bis-phenol compounds.

One hundred parts of the product of Example 1, in co-pending Ser. No. 082,349, filed Oct. 5, 1979, entitled "Micellar Solutions of Thin Film Spreading Agents Comprising A Polyether Polyol", was reacted with 15 parts of the diglycidyl ether of bis-phenol A, followed by reacting with 80 parts of the product of Example IA, above, all in accordance with the procedure of the Seale, et al, patent, Example D8. Addition of the final 300 parts of $SO_2$ extract was omitted. This product meets the three criteria for thin film spreading agent.

EXAMPLE II

The procedure employed in Example 44a of U.S. Pat. No. 2,499,365, to M. DeGroote, issued Mar. 7, 1950, was followed to produce an alkaline catalyzed, fusible, xylene-soluble p-tertiary amylphenol resin.

Using the procedure described under Example IA, above, 1,000 lbs. of this resin solution was reacted with 1,000 lbs of a mixture of 150 lbs. of butylene oxide, 250 lbs. of propylene oxide and 600 lbs. of ethylene oxide.

After completion of the oxide addition, the temperature was adjusted to 140° C. and 70 lbs of diemthyl, diglycidyl hydantoin dissolved in 250 lbs. of xylene was slowly introduced with rapid stirring. After completion of the epoxy hydantoin addition, stirring and heating at 140° C. was continued until the batch viscosity at 100° C. was between 1,500 and 2,000 centipoises.

EXAMPLE III

The procedure of Example I was followed except that condensation with the oxylalkylated phenolic resin and final addition of SO$_2$ extract were both deleted.

The product was an effective demulsifier meeting the criteria described above, therefor. This product was also found to improve the percentage of oil recovery when used as an additive to water used in experimental secondary waterflooding tests.

EXAMPLE IV

The procedure of Example I is followed, except that 12 parts of Ciba-Geigy Resin XB2818, an alkylated dihydantoin containing three epoxide groups, was substituted for the 15 parts of diglycidyl ether used in Example I. Reaction was continued until the product exhibited a viscosity of about 1,500 centipoises at 100° C. The final product met the three criteria for TFSA.

EXAMPLE V

Into a 500 gal. stainless steel autoclave equipped with stirrer, steam jacket, cooling coils and appropriate inlet and outlet lines was introduced 1,000 lbs. of commerical polypropylene glycol with average molecular weight of 4,000. Sixteen pounds of a 50% aqueous solution of potassium hydroxide was then added to the glycol. Steam was admitted to the jacket and the contents were stirred while the temperature was brought to about 125° C.

A slow stream of nitrogen was blown through the vessel contents during the heating period to effect removal of water. Nitrogen sparging was stopped when a sample of the glycol showed a water content below 0.1%.

At this point, commercial epoxidized soyabean oil containing an average of three epoxy groups per glyceride molecule was added at a slow continuous rate while the temperature was increased to 145° C. Addition was stopped after 90 lbs. of epoxidized soyabean oil had been introduced. Stirring and heating at 145° C. was continued until the reaction mixture had a viscosity within the range of 1,200 to 1,400 centipoises when measured at 100° C.

EXAMPLES OF MICELLAR SOLUTIONS INCORPORATING TFSA's

EXAMPLE A

|  | Wt. % |
|---|---|
| Product of Example II | 38 |
| Isopropanol | 16 |
| Dodecylbenzene sulfonic acid | 16 |
| Diethylene triamine | 4 |
| Water | 26 |

This product is an effective emulsion breaker for emulsions produced in the Glendive field of Montana and is particularly useful as a synergistic component when combined with other aqueous TFSA compositions such as described in my co-pending application Ser. No. 082,349, filed Oct. 5, 1979, entitled Micellar Solutions of Thin Film Spreading Agents Comprising A Polyether Polyol.

EXAMPLE B

|  | Wt. % |
|---|---|
| Product of Example III | 25 |
| Xylene | 8 |
| Sodium salt of p-nonylphenoxy-pentaethoxy sulfuric acid | 15 |
| Isopropanol | 31 |
| Methanol | 6 |
| Water | 15 |

This is a solution of very low pour point which is suitable for use as a demulsifier in oil fields where ambient temperatures are well below freezing.

EXAMPLE C

|  | Wt. % |
|---|---|
| Product of Example III | 31.3 |
| Isopropanol | 31.2 |
| Ammonium, nonylphenoxyethoxy sulfate | 15.6 |
| Sodium acetate | 0.2 |
| Water | 21.7 |

Among procedures which have been found useful in selecting effective micellar TFSA solutions for this use, one involves a determination of oil displacement efficiency from prepared oil-containing rock cores in equipment described below. A tube of glass or transparent polymethacrylate ester, having an inside diameter of about 3.5 cm (1½ in.) and a length of about 45 cm (18 in.), is fitted with inlet connections and appropriate valves at each end. The tube is mounted vertically on a rack in an air bath equipped with a fan, heater and thermostat which allows selection and maintenance of temperatures in the range of between about 25°–130° C.

To select an effective micellar TFSA solution for use in a given oil formation, samples of the oil, of the producing rock formation and of the water to be used in the flooding operation were obtained. The formation rock is extracted with toluene to remove oil, is dried and is then ground in a ball mill to the point where a large percentage passes a 40 mesh sieve. The fraction between 60 and 100 mesh in size is retained. The tube described above is removed from the air bath, opened and, after insertion of a glass wool retainer at the lower end, is packed with the ground formation rock. The tube is tapped gently from time-to-time during filling to ensure close packing and is visually inspected to assure absence of voids.

The tube is then returned to the air bath, connected to the inlet tubing, the temperature is adjusted to the oil formation temperature and water representative of that produced from the formation is admitted slowly through the bottom line from a calibrated reservoir in an amount just sufficient to fill the packed rock plug in the tube. This volume is determined from the calibrations and is referred to as the "pore volume", being that voluem of water just sufficient to fill the pores or interstices of the packed plug rock.

The upper line to the reservoir is then connected to a calibrated reservoir containing the oil representing that from the formation to be flooded. By proper manipulation of valves, the line is filled with oil which is then slowly pumped into the core from the reservoir after the lower valve is opened to allow displacement of the formation water.

As breakthrough of oil at the bottom is noted, pumping is stopped and the volume of oil introduced into the sand is determined from the reservoir readings. This is referred to as the voluem of oil in place. The tube of sand containing oil is then left in the air bath at the temperature of the formation for a period of three days to allow establishment of equilibrium between the ground formation rock and the oil with respect to adsorption of oil constituents on the rock and lowering of interfacial tension. The time allowed for equilibrium may be varied widely. At higher temperatures, the time required to reach equilibrium is probably reduced. Usually, for comparative tests, three days are allowed to age the oil-rock plug. Results with this procedure closely simulate work with actual cores of oil-bearing rock.

The oil and water samples used for test purposes are preferably taken under an inert gas such as high purity nitrogen, and are maintained out of contact with air during all miniuplations in order to prevent oxidation of the oil and concomitant introduction of spurious polar, surface-active constituents in the oil. At this point, the rock-oil system simulates the original oil formation before primary production oil has commenced and well before any secondary waterflood operation.

The upper inlet line to the tube is now connected to the sample of water used in the flooding of the oil formation and, by means of a syringe pump or similar very small volume positive displacement pump, the water is pumped into the sand body from the top to displace fluids out of the bottom tubing connection into a calibrated receiver. The pumping rate is adjusted to one simulating the rate of flood water advance in an actual operation, which is usually in a range of 1 to 50 cm per day. Pumping is maintained at this rate until two pore volumes of water have been pumped through the sand.

The volumes of fluids collected in the receiver are measured and the relative amount of oil and water displaced from the rock sample are determined and recorded. Of special interest is the volume of oil displaced as a fraction of the original pore volume. This information may be viewed as an indication of the approximate percentage of oil originally in place which is produced by natural water drive following drilling of a well into the rock formation followed by the primary phase of field production carried to the approximate economic limit.

Following this step, one to three additional pore volumes of water containing the TFSA micellar solution to be tested are pumped slowly through the plug and the volumes of additional oil and water displaced are determined. Typically, where such an initial "slug" of micellar TFSA solution is introduced, it may be contained in a volume of fluid ranging from 1% to 100% of the pore volume, but most frequently it will be in a slug volume of 10% to 50% of pore volume.

After this final displacement step, the produced oil and water are again measured. By comparing the amount of oil produced by this additional injection of water containing, or preceded by a solution, of micellar TFSA solution with the amount produced when the same volume of water containing no TFSA solution is injected, one can evaluate the effectiveness of the particular micellar TFSA solution used for enhancing the recovery of additional oil over and above that obtained by ordinary waterflooding.

Generally, six or more sand columns of the kind described above are mounted in the heated air bath. Test of a given micellar TFSA solution is then run in triplicate, using identical conditions and concentrations, simultaneously with three blank tests run similarly but without addition of micellar TFSA solution to the water.

The composition of Example C was tested by this procedure with the following conditions:

| Oil | East Texas Field |
| --- | --- |
| | API Gravity approximately 40.4 |
| Water | Mixed water used in flood operations |
| Airbath Temperature | 150° F. (Same as formation temperature) |

Oil was displaced by pumping two pore volumes of water into the sand. After measuring the volumes of oil and water produced through the bottom line, a further 0.2 pore volumes of water containing 3,500 ppm of the composition of Example C was injected followed by 2.8 volumes of water containing 200 ppm of the composition of Example C. Measurement of the volumes of oil and water produced were read after each 0.2 pore volumes of water was injected.

Results of this test at the points of 2, 3 and 5 pore volumes of injected water are given in the table below wherein averages of three duplicate determinations are presented.

| | Oil Recovery as % of Oil in Place | | |
| --- | --- | --- | --- |
| Pore Volumes (P.V.) of Water Injected | No Chemical Addition | Composition of Example C Added to Water after Initial 2 P.V. of Water | Ratio of Increment of Oil Production After Initial 2 P.V. Chemical/ No Chemical |
| 2 | 40.1 | 40.1 | — |
| 3 | 43.2 | 46.2 | 2.0 |
| 5 | 46.0 | 50.0 | 1.68 |

Use of the composition of Example C in the amounts given above resulted in the production of 100% more oil from injection of one incremental pore volume of water than was produced by water injection alone and gave 68% more oil after three incremental pore volumes of treated water injection.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A homogeneous thin film spreading agent solution, comprising: (1) from between about 5% to about 75% by weight of a polyepoxide condensate of at least one of: (a) a polyalkylene oxide adduct of a fusible, water-insoluble organic aromatic hydrocarbon solvent-soluble synthetic resin, wherein said resin has from between about 4 to about 15 phenolic groups and is an alkyl or cycloaliphatic substituted phenol-aldehyde condensate of an ortho- or para-substituted phenol and an aldehyde, said condensate resin being thereafter further condensed with an alkylene oxide containing less than about five carbon atoms in an amount equal to at least one mole of alkylene oxide per phenolic moiety of said resin, the weight ratio of oxide to condensation product in a solvent-free state being between about 1-to-10 and about 10-to-1; and (b) a polyether polyol having the formula:

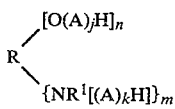

wherein:
A is an alkylene oxide group, —$C_iH_{2i}O$—;
O is oxygen;
i is a positive integer from 2 to about 10;
j is a positive integer no greater than about 100;
k is a positive integer no greater than about 100;
N is nitrogen;
$R^1$ is one of hydrogen, a monovalent hydrocarbon group containing less than about $C_{11}$, or [$A_LH$];
L is a positive integer no greater than about 100;
R is a hydrocarbon moietyy of a polyol, a primary or secondary amine, a primary or secondary polyamine, a primary or secondary amino alcohol, and hydrogen; and
m+n is no greater than about 4 when R is other than hydrogen and one of m and n is zero and the other is unity when R is hydrogen, said polyepoxide being selected from the group consisting of the diglycidyl ether of dihydroxyphenyl-methyl methane and the lower polymers thereof, diisobutenyl dioxide, polyepoxypolyglycerols, epoxidized linseed oil and epoxidized polybutadiene, said condensate, at about 25° C.: (A) having a solubility in water and isooctane of less than about 1%, by volume; (B) having a solubility parameter from between about 6.8 and about 8.5; and (C) spreading at the interface between white, refined mineral oil and distilled water to form a film having a calculated thickness no greater than about 20 Angstroms, at a spreading pressure of about 16 dynes per cm; (2) from about 2% and about 30% by weight of a hydrotropic agent having one of the formulas:

X—Z  (A)

wherein
X is an alkyl, alicyclic, aromatic, alkylalicyclic, alkylaryl, arylalkyl, alicyclicalkyl, heterocyclic or substituted heterocyclic radical having 2 to 13 carbon atoms; and wherein
Z is one of:

—OH;

—CHO;

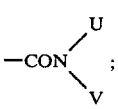

—COOH; and —OCH$_3$;

and U and V are hydrogen or hydrocarbon substituents,

X—Y—R—(Z)$_n$,  (B)

wherein:
Z is one of

—OH;

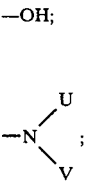

—CHO;

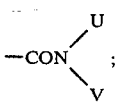

—COOH; and —OCH$_3$;

X is an alkyl, alicyclic, aromatic, alkylalicyclic, alkylaryl, arylalkyl, alicyclicalkyl, heterocyclic or substituted heterocyclic radical having 2 to 12 carbon atoms;
R is a member selected from the class consisting of, —CH$_2$—, —C$_2$H$_4$—, C$_3$H$_5$=, —C$_3$H$_6$—, and —C$_2$H$_4$—O—C$_2$H$_4$—;

n is either a one or two integer, the integer dependent upon the selection of R;
Y is a member selected from the class consisting of:

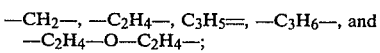
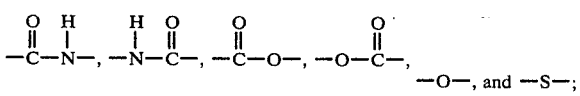

—O—, and —S—;

and U and V are hydrogen or hydrocarbon substituents;
(3) from between about 2% and about 30% by weight of an amphipathic agent having at least one radical having from between about 10 and about 64 carbon atoms per molecule; and (4) from between about 15% and about 90% by weight, water.

2. The composition of claim 1 wherein the polyepoxide is:

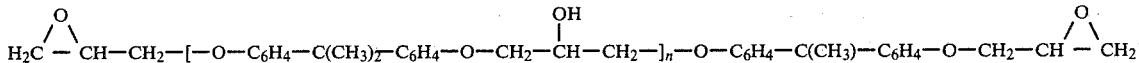 

where n is zero or a positive integer of less than about 6.

3. The composition of claim 1 wherein the hydrotropic agent is an alcohol.

4. The composition of claim 1 wherein the hydrotropic agent is an aldehyde.

5. The composition of claim 1 wherein the hydrotropic agent is a semi-polar oxygen-containing compound capable of forming hydrogen bonds.

6. The composition of claim 1 wherein the hydrotropic agent is an amine.

7. The composition of claim 1 wherein the hydrotropic agent is a carboxy amide.

8. The composition of claim 1 wherein the hydrotropic agent is a phenolate.

9. The composition of claim 1 wherein the amphipathic agent is a hydrophobic hydrocarbon residue-containing composition where the hydrocarbon residue is aliphatic, alkylalicyclic, aromatic, arylalkyl or alkylaromatic.

10. The composition of claim 1 wherein the amphipathic agent contains an uninterrupted chain of from between about 10 and about 22 carbons.

11. The composition of claim 1 wherein the amphipathic agent is an anion-active soap.

12. The composition of claim 1 wherein the amphipathic agent comprises ammonium lauryl sulfonate.

13. The composition of claim 1 wherein the amphipathic agent comprises mahogany or green sulfonates of petroleum, petroleum fractions, or petroleum extracts.

14. The composition of claim 1 wherein the amphipathic agent comprises dodecylbenzene sulfonate.

15. The composition of claim 1 wherein the amphipathic agent comprises sodium naphthenate.

16. The composition of claim 1 wherein the amphipathic agent comprises cetyl pyridinium chloride.

17. The composition of claim 1 wherein the amphipathic agent comprises trimethyl-heptadecyl ammonium chloride.

18. The composition of claim 1 wherein the amphipathic agent comprises octadecylamine acetate.

19. The composition of claim 1 wherein the amphipathic agent comprises an oxyethylated alkylphenol.

20. The composition of claim 1 wherein the amphipathic agent comprises an alcohol ether of a polyethylene glycol.

21. The composition of claim 1 wherein the amphipathic agent is anionic.

22. The composition of claim 1 wherein the amphipathic agent is cathionic.

23. The composition of claim 1 wherein the amphipathic agent is nonionic.

24. A homogeneous micellar thin film spreading agent solution, comprising: (1) from between about 5% and about 75% by weight of a polyepoxide condensate of at least one of: (a) a polyalkylene oxide adduct of a fusible, water-insoluble organic aromatic hydrocarbon solvent-soluble synthetic resin, wherein said resin has from between about 4 to about 15 phenolic groups and is an alkyl or cycloaliphatic substituted phenol-aldehyde condensate of an ortho- or para-substituted phenol and an aldehyde, said condensate resin being thereafter further condensed with an alkylene oxide containing less than about five carbon atoms in an amount equal to at least one mole of alkylene oxide per phenolic moiety of said resin, the weight ratio of oxide to condensation product in a solvent-free state being between about 1-to-10 and about 10-to-1; and (b) a polyether polyol derived from the reaction of an alkylene oxide containing less than about 10 carbon atoms with a member of the group consisting of polyols, amines, polyamines and amino alcohols containing from about 2 to about 10 active hydrogen groups capable of reaction with alkylene oxides, said polyether polyol having an average molecular weight of about 15,000 or less, said member having 18 or less carbon atoms wherein said polyepoxide is selected from the group consisting of the diglycidyl ether of dihydroxyphenyl-methyl methane and the lower polymers thereof, diisobutenyl dioxide, polyepoxypolyglycerols, epoxidized linseed oil and epoxidized polybutadiene, said condensate, at about 25° C.: (A) having a solubility in water and isoctane of less than about 1%, by volume; (B) having a solubility parameter from between about 6.8 and about 8.5; and (C) spreading at the interface between white, refined mineral oil and distilled water to form a film having a calculated thickness no greater than about 20 Angstroms, at a spreading pressure of about 16 dynes per cm; (2) from between about 2% and about 30% by weight of a hydrotropic agent comprising a semi-polar hydrogen bond forming compound containing at least one of oxygen, nitrogen and sulfur and from between about 2 and about 12 carbon atoms; (3) from between about 2% and about 30% by weight of an amphipathic agent having at least one radical having from between about 10 and about 64 carbon atoms per molecule; and (4) from between about 15% and about 90% by weight, water.

25. The composition of claim 24 wherein the solubility parameter at about 25° C. of the polyepoxide condensate is from between about 7.1 and about 7.9.

26. The composition of claim 24 wherein the hydrotropic agent is an alcohol.

27. The composition of claim 24 wherein the hydrotropic agent is an aldehyde.

28. The composition of claim 24 wherein the hydrotropic agent is a semi-polar oxygen-containing compound capable of forming hydrogen bonds.

29. The composition of claim 24 wherein the hydrotropic agent is an amine.

30. The composition of claim 24 wherein the hydrotropic agent is a carboxy amide.

31. The composition of claim 24 wherein the hydrotropic agent is a phenolate.

32. The composition of claim 24 wherein the amphipathic agent is a hydrophobic hydrocarbon residue-containing composition where the hydrocarbon residue is aliphatic, alkylalicyclic, aromatic, arylalkyl or alkylaromatic.

33. The composition of claim 24 wherein the amphipathic agent contains an uninterrupted chain of from between about 10 and about 22 carbons.

34. The composition of claim 24 wherein the amphipathic agent is an anion-active soap.

35. The composition of claim 24 wherein the amphipathic agent comprises ammonium lauryl sulfonate.

36. The composition of claim 24 wherein the amphipathic agent comprises mahogany or green sulfonates of petroleum, petroleum fractions, or petroleum extracts.

37. The composition of claim 24 wherein the amphipathic agent comprises dodecylbenzene sulfonate.

38. The composition of claim 24 wherein the amphipathic agent comprises sodium naphthenate.

39. The composition of claim 24 wherein the amphipathic agent comprises cetyl pyridinium chloride.

40. The composition of claim 24 wherein the amphipathic agent comprises trimethyl-heptadecyl ammonium chloride.

41. The composition of claim 24 wherein the amphipathic agent comprises octadecylamine acetate.

42. The composition of claim 24 wherein the amphipathic agent comprises an oxyethylated alkylphenol.

43. The composition of claim 24 wherein the amphipathic agent comprises an alcohol ether of a polyethylene glycol.

44. The composition of claim 24 wherein the amphipathic agent is anionic.

45. The composition of claim 24 wherein the amphipathic agent is cationic.

46. The composition of claim 24 wherein the amphipathic agent is nonionic.

* * * * *